UNITED STATES PATENT OFFICE.

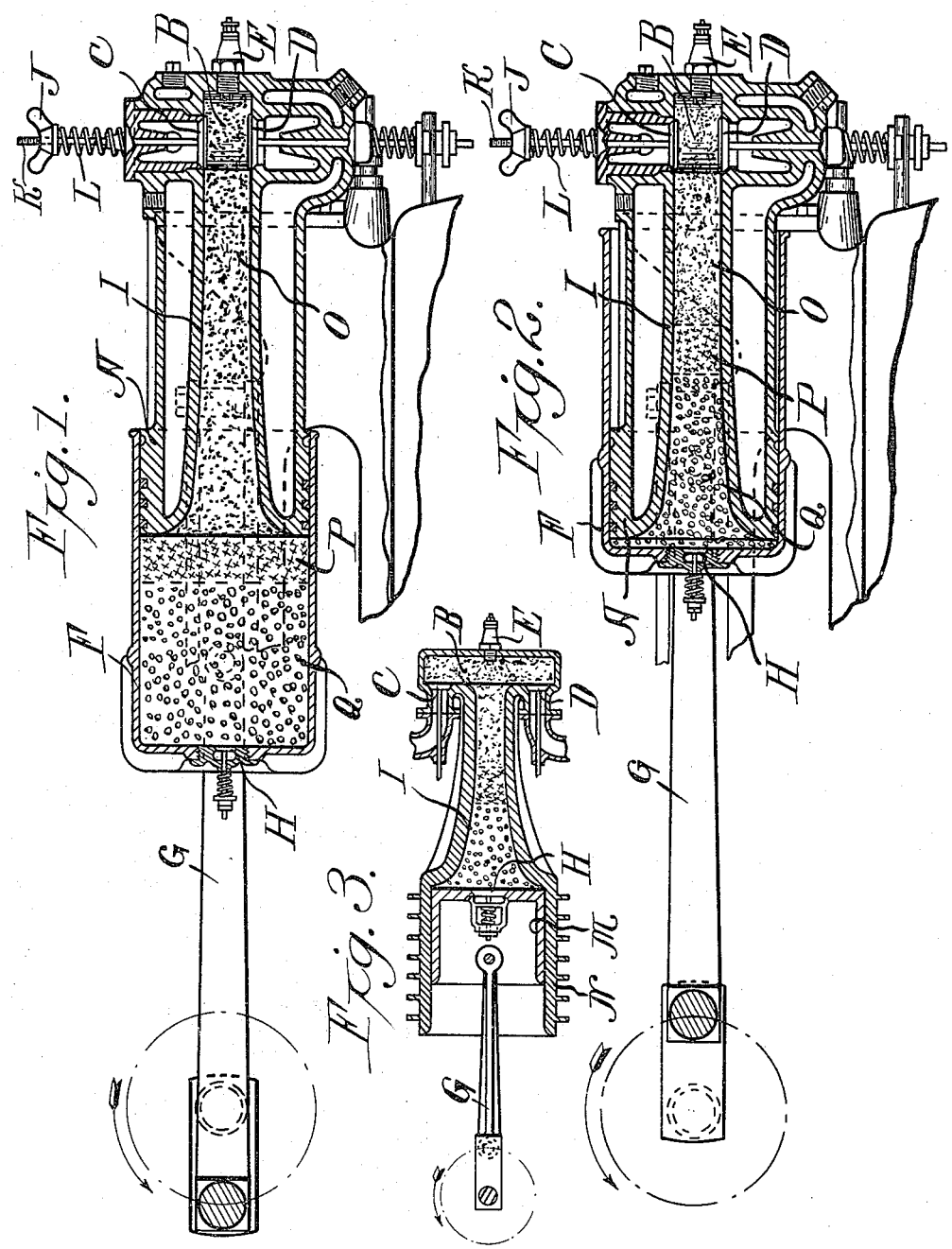

WILLIAM A. SORG, OF MINNEAPOLIS, MINNESOTA, ASSIGNOR, BY MESNE ASSIGNMENTS, TO FREDERICK G. BRADBURY, TRUSTEE.

COMBUSTION-ENGINE.

1,153,526.  Specification of Letters Patent.  Patented Sept. 14, 1915.

Application filed October 27, 1911. Serial No. 657,057.

*To all whom it may concern:*

Be it known that I, WILLIAM A. SORG, a citizen of the United States, residing at Minneapolis, in the county of Hennepin and State of Minnesota, have invented a new and useful Combustion-Engine, of which the following is a specification.

My invention relates to an improved combustion engine and is adapted to develop power more efficiently under variations of fuel supply than hertofore.

With my invention the fuel charge, inert gases and a volume of air are formed in separate strata in the combustion chamber of the engine during a compression stroke, the stratum of air being inversely proportionate in amount to the stratum of fuel charge under variations in the amount of the latter. In this manner when the amount of load or fuel charge is changed, the compression of the charge owing to the unchanged volume in the combustion chamber remains uniform and in consequence the efficiency, reliability and effectiveness of operation of the engine is increased. Further the stratification of the fuel, air and inert gases causes the entire contents of the combustion chamber to be heated and expanded evenly and aided by the progressive action of combustion in the engine delivers a constant force to the moving element thereof during its working stroke.

In describing my improved engine reference will be made to the accompanying drawing forming part of this specification in which—

Figure 1 is a sectional detail of a combustion engine constructed in accordance with my invention and showing the parts in position after an intake or charging stroke of the reciprocating member; Fig. 2 is a view similar to Fig. 1 showing the parts at the completion of a compression stroke, and Fig. 3 is a sectional detail of an alternative construction which is adapted to be operated by my process.

In the drawing A is a hollow stationary piston having, on its outer end a valve chamber B, an ingress valve C for admitting a hydrocarbon mixture into the valve chamber, an exhaust valve D for the egress of the products of combustion after a mixture charge has been consumed, and a spark plug E having a point of ignition in the valve chamber. Mounted upon the piston A is a reciprocable cylinder F connected to an operating crank arm G in the usual manner and having in its outer end an ingress valve H for receiving air into the cylinder during each intake stroke thereof. The air intake valve H and the fuel intake valve C are of such relative size as to admit such proportions of air and fuel in the combustion chamber as will give the most advantageous results according to kind and quality of fuel mixture in carrying out my process, a thumb nut J threaded on the valve stem K of valve C serving to vary the tension of valve spring L and regulate the action of valves C and H. The air inlet valve H can be dispensed with when desired, such construction being set forth in my companion application filed on the 22nd day of March, 1911, bearing Serial Number 616,159. The portion I of the piston chamber leading from the valve chamber B into the cylinder is shown funnel shaped opening toward the reciprocable cylinder the reduced end of the funnel opening into the valve chamber B and being less in cross-sectional area at that point than the cross-sectional area of said valve chamber.

During a charging stroke hydrocarbon mixture is admitted through the fuel ingress valve and forms in a stratum in the combustion chamber, the inert gases remaining from the previous cycle also forming in a stratum at the forward end of the stratum of fuel mixture. Simultaneously with this action air admitted through the air ingress valve also forms in a stratum adjacent the column of inert gases on the side opposite the fuel mixture stratum, thus filling the chamber. The compression stroke of the cylinder following compresses the strata of fuel charge, inert gases and air. Ignition of the prime charge follows on dead center or as desired and the heat developed by the fuel charge assists in expanding the air and inert gases causing a force progressive in action throughout the stroke to be exerted upon the moving power member of the engine.

The richest part of the fuel mixture charge occurs at a point adjacent the ingress valve while the leanest occurs at a point adjacent the opposite end of the combustion chamber, and the point of ignition is placed so as to ignite the richest fuel mixture first thus tending to promote the work of exerting a continuous force against the moving member during the power stroke, avoiding excessive heat losses and preventing the development of a spontaneous wave detonation and excessive shock. Variations in fuel supply are compensated by the admission of air through the air ingress valve in inverse proportion to the amount of fuel charge admitted thereby causing an even and constant compression of the fuel charge irrespective of the amount of fuel and load. For clearness the stratum of mixture charge is represented by dots O in the drawing, the stratum of inert gases by crosses P, and the stratum of air by circles Q.

The bore or diameter of the piston or tube is less than the bore of the cylinder thus causing the surface of the fuel stratum in contact with the stratum of inert gases to be minimized when under compression, reducing the tendency of the hydrocarbon fuel charge to mix with the inert gases and pure air and leaving the contents of the combustion chamber under compression assembled in separate strata and in position to perform the most effective results under variations of load upon the engine with scarcely any shock or jar.

The valve chamber being larger than the tube ahead of it, enough gas is expanded on dead center to very materially raise the average pressure of the contents of the combustion chamber and to retain such pressure as the piston moves forward. The effect of firing a portion of the charge at the end of the tube is to compress the carbureted gases beyond the valve chamber against the strata of inert gases and air and to heat and expand them. After combustion of the fuel charge is completed the heated air and inert gases continue to exert pressure until the power stroke is complete. During the following stroke the usual scavenging of dead gases in the combustion chamber takes place. The invention can obviously be applied in essential features to two cycle operation as well as four cycle as described. By using relatively pure air in the combustion chamber in inverse proportion to the amount of fuel which is used a low average temperature is maintained making the use of the long tubular combustion chamber efficient and warping and distortion of the valves negligible.

In Fig. 3 the engine is illustrated as having a reciprocable member in the form of an inside piston M and a stationary member in the form of an outside cylinder N these parts corresponding respectively with the inside stationary piston A and with the outside cylinder F above described and being adapted to operate in accordance with my invention. The use of the terms piston and cylinder is therefore relative and it is intended that either term is applicable to the reciprocable member within the meaning intended in this specification and claims following. It will however be noted that in the construction set forth in Fig. 3, that the method of cooling the stationary member is by radiation directly to the outer atmosphere and as a result a hot tube is produced in which heavy fuel oils such as kerosene and crude oil and light oil such as gasolene and alcohol are adapted to be efficiently and effectively vaporized.

In the various forms of this invention the combustion chamber tube is of less inner diameter, than the diameter of the bore of the reciprocable member F, (see Fig. 1), and than the diameter of the bore of the outside cylinder N, (see Fig. 3), and the tube I is of sufficient length to contain the entire fuel charge before ignition. The "working space of said piston" as used in the claims following is the space defined by the inner end of the tube, the inner end of the reciprocable member and the bore of the reciprocable member F, in the construction illustrated in Fig. 1, and the space defined by the inner end of the tube, the inner end of the reciprocable member and the bore of the stationary cylinder N, in the construction illustrated in Fig. 3.

Having described my invention, what I claim as new and desire to protect by Letters Patent is:

1. A combustion engine, comprising, in combination, a piston and cylinder in reciprocable connection, one of said members having a valved end portion adapted to admit air into the space within said members during the intake stroke, and the other member being formed with a long tubular combustion chamber valved to admit a fuel charge and exhaust spent gases and adapted to contain the entire fuel charge before ignition, the inner diameter of said tubular structure being materially less than the diameter of the working space of said piston, whereby the contents of said working space and the mixture charge in said tubular chamber are prevented from mixing before ignition.

2. A combustion engine, comprising, in combination, a piston and cylinder in reciprocable connection, one of said members having a valved end portion adapted to admit air into the space within said members during the intake stroke and the other member being formed with a long tubular combustion chamber valved to admit a fuel charge and exhaust spent gases, the capacity and shape of said chamber being capable of holding the entire charge of fuel mixture in a stratum separate from the contents of the working space of said piston before ignition, and means for igniting said fuel mixture while in a stratum.

3. A combustion engine, comprising, in combination, a piston and cylinder in reciprocable connection, one of said members having a valved end portion adapted to admit air into the space within said members during the intake stroke and the other member having a long tube forming a combustion chamber leading from the working space of said piston and terminating in a valve chamber, mixture inlet and exhaust valves seated in the frame of said valve chamber, said combustion and valve chambers being adapted to retain an entire charge of fuel mixture in the form of a column previous to ignition and exposing a comparatively small surface area to the contents of said working space to reduce tendency of the fuel charge mixing with air admitted into said working space, said valve chamber being larger in cross sectional area than the adjacent portion of the tube ahead of it, and means for igniting the contents of said valve chamber while the fuel mixture in said tube and the air in said working space remain in separate strata.

4. A combustion engine, comprising, in combination, a piston and cylinder in reciprocable connection, one of said members being valved to admit air therein, and the other of said members being formed with a long tubular combustion chamber valved to admit a fuel charge and exhaust spent gases and adapted to contain substantially the entire fuel charge before ignition, the inner diameter of said chamber being materially less than the diameter of the working space of said piston, whereby the contents of said working space and the mixture charge in said tubular chamber are substantially prevented from mixing before ignition.

5. A combustion engine, comprising, in combination, a piston and cylinder in reciprocable connection, one of said members being valved to admit air therein, and the other of said members being formed with a long tubular combustion chamber valved to admit a fuel charge near one end and exhaust spent gases and adapted to contain substantially the entire fuel charge before ignition, the inner diameter of said chamber being materially less than the diameter of the working space of said piston, whereby a rich fuel mixture is adapted to occur near said fuel ingress valve and a lean fuel mixture near the opposite end of said tubular chamber, and ignition means placed near said fuel ingress valve to ignite the richest fuel mixture first.

In testimony whereof, I have signed my name to this specification, in the presence of two subscribing witnesses.

WILLIAM A. SORG.

Witnesses:
H. L. FISCHER,
F. G. BRADBURY.

Copies of this patent may be obtained for five cents each, by addressing the "Commissioner of Patents, Washington, D. C."